(12) United States Patent
Murray

(10) Patent No.: US 12,432,089 B2
(45) Date of Patent: Sep. 30, 2025

(54) IDENTIFYING SOURCE OF LAYER-2 LOOP IN RING NETWORK

(71) Applicant: Hewlett Packard Enterprise Development LP, Houston, TX (US)

(72) Inventor: Christopher S. Murray, Boynton Beach, FL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 520 days.

(21) Appl. No.: 17/974,359

(22) Filed: Oct. 26, 2022

(65) Prior Publication Data

US 2024/0146574 A1    May 2, 2024

(51) Int. Cl.
| | |
|---|---|
| H04L 12/423 | (2006.01) |
| H04L 12/24 | (2006.01) |
| H04L 12/46 | (2006.01) |
| H04L 12/705 | (2013.01) |
| H04L 12/931 | (2013.01) |
| H04L 12/933 | (2013.01) |
| H04L 43/106 | (2022.01) |
| H04W 48/16 | (2009.01) |

(52) U.S. Cl.
CPC ........ *H04L 12/423* (2013.01); *H04L 12/4641* (2013.01); *H04L 43/106* (2013.01)

(58) Field of Classification Search
CPC ... H04L 12/423; H04L 12/42; H04L 12/2856; H04L 12/4675; H04L 12/4641; H04L 41/22; H04L 41/08; H04L 41/0813; H04L 41/0866; H04L 12/437; H04L 12/44; H04L 12/462; H04L 12/4633; H04L 43/106; H04L 49/102; H04L 12/18; H04L 12/427; H04L 12/4637; H04L 45/18; H04L 41/0803; H04L 41/14; H04L 69/324; H04L 41/0631; H04L 43/10; H04L 43/50; H04L 49/354; Y02D 30/00
USPC ......................................... 370/452
See application file for complete search history.

(56) References Cited

U.S. PATENT DOCUMENTS

| | | | | |
|---|---|---|---|---|
| 8,085,676 | B2 * | 12/2011 | Skalecki | H04L 45/28 |
| | | | | 370/222 |
| 10,142,203 | B2 * | 11/2018 | Jadav | H04L 41/0661 |
| 10,237,088 | B2 * | 3/2019 | Mishra | H04L 45/66 |
| 2016/0344571 | A1 * | 11/2016 | Marvin | H04L 45/08 |
| 2017/0180153 | A1 * | 6/2017 | Subramaniam | H04L 49/354 |
| 2018/0115500 | A1 * | 4/2018 | Murray | H04L 45/22 |

(Continued)

*Primary Examiner* — Edan Orgad
*Assistant Examiner* — Vanneilian Lalchinthang
(74) *Attorney, Agent, or Firm* — Yao Legal Services, Inc.

(57) ABSTRACT

A system for identifying the source of a loop in a ring network is provided. During operation, the system receives a first message, which indicates the presence of a looped packet, from a network device of the ring network. The system receives a second message from a respective network device with an uplink to an external network. The second message can include traffic information associated with the uplink. Upon determining based on the first message that a local link intended to be disabled is active, the system determines that a loop is present in the ring network. Upon determining that a plurality of uplinks are active based on the second message, the system determines that a loop is present in the uplinks. If a loop is not present in the ring network or in the uplinks, the system determines that a loop is present in the external network.

20 Claims, 9 Drawing Sheets

(56) References Cited

U.S. PATENT DOCUMENTS

| | | | |
|---|---|---|---|
| 2018/0191603 A1* | 7/2018 | Krattiger | H04L 41/0803 |
| 2018/0287885 A1* | 10/2018 | Shakimov | H04L 41/40 |
| 2019/0028299 A1* | 1/2019 | Murray | H04L 63/0236 |
| 2020/0389469 A1* | 12/2020 | Litichever | H04W 12/12 |
| 2023/0283549 A1* | 9/2023 | Brar | H04L 45/66 |
| | | | 370/390 |

* cited by examiner

IDENTIFYING SOURCE OF LAYER-2 LOOP IN RING NETWORK

BACKGROUND

Field

The present disclosure relates to communication networks. More specifically, the present disclosure relates to a method and system for identifying the source of a layer-2 loop in a ring network.

BRIEF DESCRIPTION OF THE FIGURES

In the figures, like reference numerals refer to the same figure elements.

DETAILED DESCRIPTION

Figure 1A:
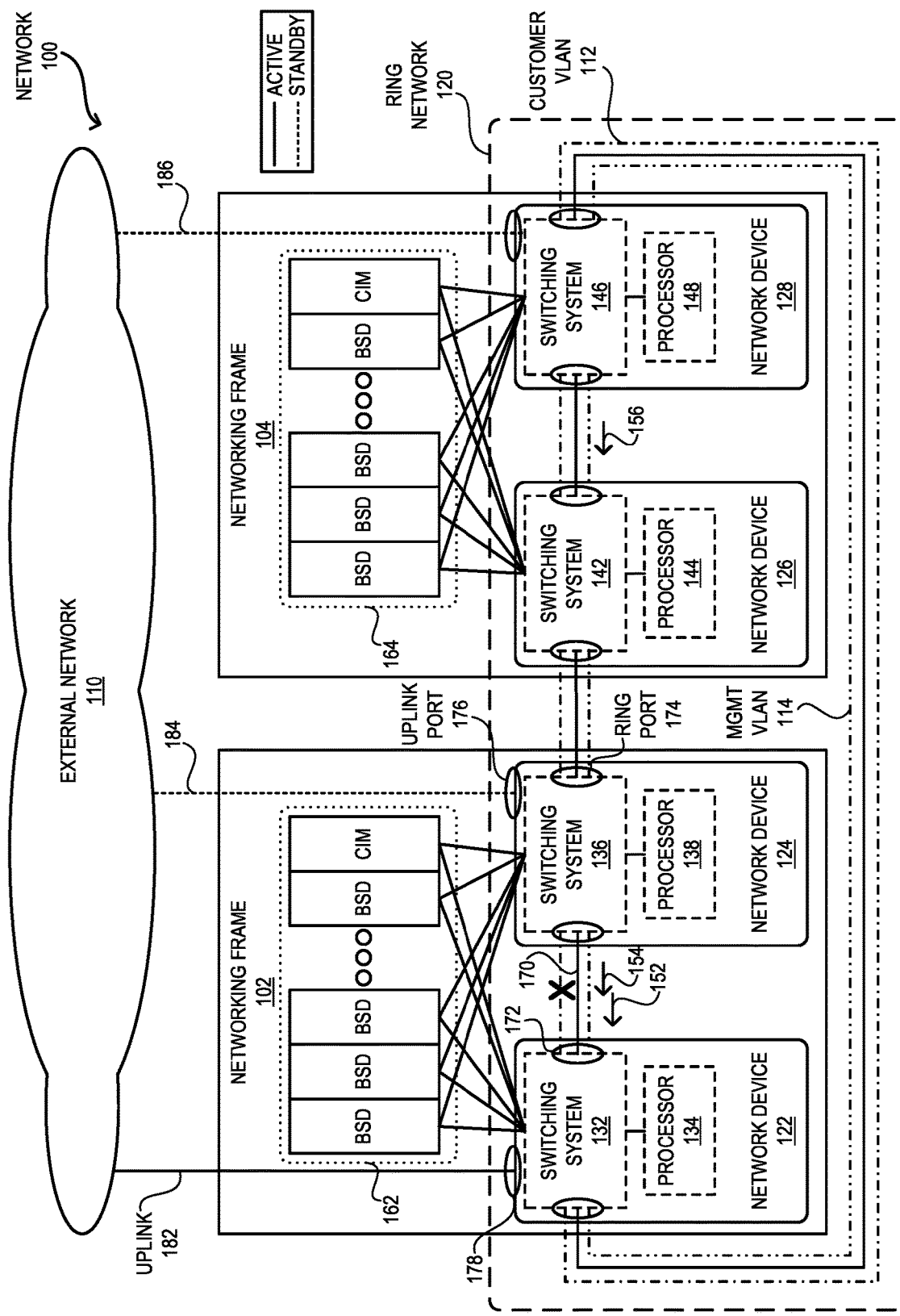
FIG. 1A illustrates an example of a ring network supporting efficient identification of the source of a layer-2 loop, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, service providers continue to rely on datacenters to store and provide a large volume of data at a high rate over the Internet. In a datacenter, network devices, such as Ethernet switches or connect fabrics, are often linked to allow greater connectivity and redundancy. Among various network topologies, a ring topology is a network configuration where device connections create a circular, closed-loop data path. Each networked device is connected to two others, forming a loop. Together, devices in a ring topology are referred to as a ring network. A ring network can provide a redundant path among the network devices. For example, a respective network device can provide a left link and a right link so that the network device may be connected in a ring topology.

Since there are two paths through the ring network for communicating between any two network devices, the ring network can include loops. To ensure loop-free forwarding, an Ethernet Ring Protection Switching (ERPS) protocol, which is defined by an International Telecommunication Union (ITU) standard G.8032, can facilitate layer-2 loop prevention in the ring network. One of the network devices the ring can be designated as the primary network device that provides a Ring Protection Link (RPL), which is disabled to prevent a loop in the network. The primary network device can also be referred to as the RPL owner. The primary network device can also be responsible for determining an active uplink to the corresponding external network for the layer-2 network. However, the ERPS protocol may not determine the source (e.g., the location) of the loop.

The aspects described herein solve the problem of determining the source of a loop in a ring network by (i) providing traffic information associated with a respective uplink to the primary network device upon receiving a notification indicating the presence of a loop; (ii) analyzing traffic information on the RPL and a respective uplink to determine traffic activity over these links; and (iii) determining which segment of the ring network has active during the detection of the loop based on the analysis. The segment that has actively forwarded and received traffic while the loop is detected in the network can correspond to the source of the loop.

Typically, a link and its corresponding port are disabled in the ring network to break a loop in a respective layer-2 network, such as a virtual local area network (VLAN). The port participating in the ring network can be referred to as a ring port. If the ring network can be managed by a ring protocol. For example, if the ring is managed using ITU standard G.8032, the ring network can deploy the ERPS protocol. Accordingly, the ring network can include a primary network device responsible for disabling the link (e.g., the RPL). The ring protocol can indicate which network device can be designated as the primary network device. The ring port coupling the RPL on the primary network device can be referred to as the RPL ring port. The RPL ring port can be a member port of a spanning tree group. The spanning tree group can include a set of VLANs. Each port of the spanning tree group can be disabled, which can block traffic forwarding for the set of VLANs at that port.

Nonetheless, a loop can exist for a VLAN in the ring network if the RPL is improperly configured. Under such a scenario, all links in the ring network may remain enabled for the VLAN. In addition, to facilitate high availability, multiple network devices of the ring network can be coupled to an external network (e.g., a customer network) via corresponding uplinks. The port coupling an uplink can be referred to as an uplink port. If the ring network is properly configured, only one of the uplink ports is enabled in the ring network, ensuring a single active uplink to the external network. However, if multiple uplinks are active at the same time (e.g., due to a configuration error) for a VLAN, there can be a loop in the ring network for the VLAN. Furthermore, if the external network is misconfigured, a loop may exist in the external network for the VLAN and can impact the traffic in the ring network.

With existing technologies, the ring network may deploy a loop detection technique for determining the existence of the loop. For example, if a network device receives a packet belonging to a VLAN with a source address that matches a local address, the network device may determine that the packet has looped back to the network device on the VLAN. Such a packet can be referred to as a looped packet. Upon detecting a looped packet, the network device may determine that the ring network includes a layer-2 loop for the VLAN. Since a loop can exist in different segments of the ring network, detecting the existence of the loop may not be sufficient to mitigate the cause of the loop. Hence, the ring network may also need to identify the source of the loop (e.g., the segment that includes the loop). However, it can be challenging to deploy a unified source detection mechanism that can identify the source of the loop for all scenarios.

To solve this problem, when a network device detects the existence of the loop, the network device can send a multicast notification message to indicate the discovery of the loop to a respective other network device in the ring network. The network device can be referred to as a reporting network device since it reports the loop to all other network devices using the notification message. In addition to the reporting network device, the primary network device may also send a broadcast message indicating the detection of the loop to the other network devices of the ring network. The network device may use a management VLAN dedicated for exchanging control traffic in the ring network. Unlike a customer VLAN, the management VLAN can operate without an RPL since the control packets are not repeated in the ring network. In other words, the management VLAN may not be disabled on any of the links in the ring network. The notification message can be forwarded to all other network devices in the ring network based on layer-2 multicast propagation.

Upon receiving the notification message, a respective network device can become aware of the loop on the VLAN. If the receiving network device is coupled to an uplink to an external network, the network device can disable the uplink and collect traffic information, such as transmit and receive byte counters, for the uplink. The uplink can be an active or a standby link. The network device can maintain the byte counters to indicate the number of upstream and downstream packets sent via the uplink. The network device can then include the traffic information in an information message, which can be another notification message, and send the information message to the primary network device of the ring network.

The primary network device can receive the notification message as well as a respective information message. Based on the notification and information messages, the primary network device can determine whether the RPL, which should be disabled, is enabled for the VLAN. In other words, the primary network device can determine whether the VLAN is configured on the RPL even though the VLAN should not be configured on the RPL. The primary network device can determine whether the byte counters for the RPL are active for the VLAN. If the byte counters are active and increasing, the primary network device can determine that the source of the loop is the ring network. Such a loop can be referred to as a ring loop. The primary network device can then disable the VLAN on the RPL.

The primary network device can also determine whether the byte counters for the uplinks are active for the VLAN. If the byte counter of a standby uplink is active while the byte counter of the active uplink is active, the primary network device can determine that multiple uplinks are forwarding traffic at the same time. Hence, the source of the loop can be the uplinks to the external network. Such a loop can be referred to as an uplink loop. Since the VLAN is disabled for a respective uplink, the primary network device can select an active uplink for the VLAN and activate it (e.g., either locally or based on an instruction). On the other hand, if the RPL is disabled for the VLAN and only the active uplink is forwarding traffic, the primary network device can determine that the loop is in the external network. Such a loop can be referred to as an external loop. The administrator of the external network can then be notified regarding the external loop.

For a ring loop, the media access control (MAC) address of the reporting network device can be present in the layer-2 cache (e.g., the MAC learning table) of the ring port of the RPL in association with the VLAN (i.e., the VLAN identifier). The MAC address in the layer-2 cache can indicate that the looped packet is looped back via the RPL. For an uplink loop, the MAC address of the reporting network device can be present in the layer-2 cache of one of the uplink ports, which can indicate that the looped packet is looped back via one of the uplinks. On the other hand, for an external loop, the MAC address of the reporting network device can be present in the layer-2 cache of the active uplink port, which can indicate that the looped packet is looped back via the active uplink. In this way, the ring network can support efficient detection of the source of the loop.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." The phrases "packet" and "message" can be used interchangeably in this disclosure. Furthermore, the term "port" can refer to the port that can receive or transmit data. "Port" can also refer to the hardware, software, and/or firmware logic that can facilitate the operations of that port.

FIG. 1A illustrates an example of a ring network supporting efficient identification of the source of a layer-2 loop, in accordance with an aspect of the present application. A network 100 can include a number of networking frames 102 and 104. A respective networking frame can provide the hardware foundation for a composable networking infrastructure. A respective networking frame can include a set of backplane interfaces (e.g., slots) to support blade server devices (BSDs), each of which can be attachable to a corresponding backplane interface. A BSD can provide compute or storage resources to a networking frame, which in turn, can facilitate cooling and power supply to the BSD. In this example, networking frames 102 and 104 can support sets of BSDs 162 and 164, respectively.

Networking frame 102 can include network devices 122 and 124, and networking frame 104 can include network devices 126 and 126. Networking frames 102 and 104 can be combined using a ring network 120 to forma larger infrastructure within network 100. Hence, ring network 120 can be formed with network devices 122, 124, 126, and 128. Networking frames 102 and 104 can be pooled for the resources associated with compute, storage, fabric, cooling, power, and scalability, thereby facilitating a Composable Infrastructure (CI). BSDs 162 and 164 can be managed by respective CI managers that can manage the provisioning of the corresponding BSDs. An administrator may use the CI managers to allocate the resources to a customer.

A respective network device, which can also be referred to as a network module, can include a processor and a switching system. Network device 122 can include switching system 132 and processor 134, network device 124 can include switching system 136 and processor 138, network device 126 can include switching system 142 and processor 144, and network device 128 can include switching system 146 and processor 148. A management port of processor 134 can couple switching system 132 in network device 122. Processor 134 can configure switching system 132 with the configuration that allows switching system 132 to operate in ring network 120. Processor 134 can also run the management network software for ring network 120.

Switching system 132 can have a plurality of ring ports, such as port 172, for coupling network devices 124 and 128. Here, switching system 132 left and right ring ports that connect to neighbor network devices in ring network 120. Switching system 132 can also provide connectivity to BSDs 162 and an uplink 182 to an external network 110, which can be a customer network. In the same way, switching system 136 can provide connectivity to BSDs 162 and an uplink 184 to external network 110; and switching system 146 can provide connectivity to BSDs 164 and an uplink 186 to external network 110. On the other hand, switching system 142 may provide connectivity to BSDs 164 but may not have an uplink to external network 110. To prevent a loop, one uplink, such as uplink 182, can remain active among the uplinks to external network 110. Uplinks 184 and 186 can remain in an inactive standby state (denoted with dotted lines).

Ring network 120 can provide a redundant path between a respective pair of network devices. Since a respective network device can provide a left and a right link, network devices 122, 124, 126, and 128 can be connected in a ring topology that forms ring network 120. In ring network 120, there can be two paths, one in a clockwise and another in a counterclockwise direction, for communicating between any two network devices. Ring network 120 can support a customer VLAN 112 and a management VLAN 114. VLAN 112 can be a VLAN belonging to external network 110. Hence, network devices of ring network 120 can receive layer-2 traffic of VLAN 112 from external network 110.

On the other hand, VLAN 114 can be configured for the ring ports and the processor management port. VLAN 114 can be dedicated for exchanging control traffic in ring network 120. VLAN 114 can allow the network modules of ring network 120 to communicate over a private connection without any data being received by any other device or network coupled to ring network 120, such as external network 110. VLAN 114 can be configured with a higher priority than VLAN 112 for preventing traffic drop on VLAN 114 even when the traffic of VLAN 112 causes congestion. Unlike VLAN 112, VLAN 114 can operate without an RPL since the control packets are not repeated in ring network 120. In particular, a respective network device of ring network 120 may use a separate MAC address for VLAN 114. As a result, when a sender network device receives the packet back via VLAN 114, the sender network device can detect the separate MAC address as the source address and drop the packet. Hence, VLAN 114 may not be disabled on any of the links in ring network 120.

Fora respective customer VLAN, such as VLAN 112, a link and its corresponding ring port can be disabled in ring network 120 to break a loop in VLAN 112. If ring network 120 is protected using ITU standard G.8032, ring network 120 can deploy the ERPS protocol. Accordingly, ring network 120 can include a primary network device 122 responsible for disabling a local link, such as RPL 170 and its corresponding RPL ring port 172 for VLAN 112. The other ring port of primary network device 122, which participates in ring network 120, can remain active for VLAN 112. A respective other ring port, such as ring port 174 of switching system 136, can remain active for VLAN 112. Primary network device 122 can also be referred to as the RPL owner node. Accordingly, network device 122 can disable VLAN 112 on port 172 so that traffic of VLAN 112 is blocked on RPL 170. On the other hand, external network 110 can deploy its own loop-prevention technique, such as the Spanning Tree Protocol (STP).

Nonetheless, a loop can exist for VLAN 112 in ring network 120 if RPL 170 is improperly configured (i.e., VLAN 112 is enabled on port 172). Under such a scenario, all links in ring network 120 may remain enabled for VLAN 112, thereby forming a loop. Furthermore, if multiple uplinks, such as uplinks 182 and 184, are active at the same time (e.g., due to a configuration error) for VLAN 112, there can be a loop in ring network 120. In addition, if external network 120 is misconfigured, a loop may exist in external network 120 for VLAN 112. If a loop exists in external network 120, the packets may loop back to ring network 120 and can impact the traffic in ring network 120.

With existing technologies, ring network 120 may deploy a loop detection technique for determining the existence of the loop. For example, the forwarding hardware (e.g., a field or packet processor) of switching system 136 can be programmed with a rule to match ingress packets of VLAN 112 on a respective port with the internal, external, and management ports with a local MAC address. Upon receiving a packet of VLAN 112, a match can be found based on the rule. Switching system 136 can forward the packet to processor 138. A packet handler of the operating application running on processor 138 (e.g., the switch driver) can identify the packet as a looped packet. Upon detecting a looped packet, the application may determine that ring network 120 includes a layer-2 loop for VLAN 112.

However, the looped packet can be looped back to network device 124 via a ring loop, an uplink loop, or an external loop. Since a loop can exist in different segments of ring network 120, detecting the existence of the loop may not be sufficient to mitigate the cause of the loop. Hence, the network devices of ring network 120 may also need to identify the source of the loop (e.g., the segment that includes the loop). In particular, the network devices of ring network 120 need to determine whether the loop is caused by RPL 170, multiple active uplinks (e.g., uplinks 182 and 184), or external network 120. Accordingly, it can be challenging to deploy a unified source detection mechanism that can identify the source of the loop in ring network 120.

To solve this problem, when network device 124 detects the existence of the loop, network device 124 can operate as the reporting network device and send a multicast notification message 152 to indicate the discovery of the loop to a respective other network device in ring network 120 via VLAN 114. The notification message can be a Ring Automatic Protection Switching (R-APS) message, as defined by ITU standard G.8032. Notification message 152 can be forwarded to all other network devices in ring network 120 based on layer-2 multicast propagation via VLAN 114. When network device 124 detects the loop, network device 124 can connect traffic information associated with uplink 184. Network device 124 can also disable uplink port 176 associated with uplink 184 if VLAN 112 is configured on port 176. Disabling uplink 184 can be helpful for disabling an uplink loop.

Upon receiving the notification message, network devices 122, 126, and 128 can become aware of the loop on VLAN 112. Network device 122 can then collect traffic information associated with uplink 182 and disable VLAN 112 on corresponding uplink port 178. The traffic information associated uplink 182 with can include one or more of: the state of port 178 (e.g., standby or active), transmit counter value (e.g., bits/per second) for VLAN 112, receive counter value (e.g., bits/second) for VLAN 112, and the MAC addresses stored associated with VLAN 112 in the layer-2 cache of port 178. Similarly, network device 128 can then collect traffic information associated with uplink 186 and disable its corresponding uplink port.

Subsequently, network device 124 can include traffic information associated with uplink 184 in information message 154 and send information message 154 to network device 122. Similarly, network device 128 can include traffic information associated with uplink 186 in information message 156 and send information message 156 to network device 122. Messages 152, 154, and 156 can also include the sender network device's information, such as the MAC address, Internet Protocol (IP) version 6 (IPv6) link-layer address, the bay number within the corresponding networking frame, and an identifier (e.g., a network address) of network device 122. In this way, primary network device 122 can obtain traffic information associated with a respective uplink to external network 110. In addition, network device 122 can obtain traffic information associated with RPL 170 since RPL 170 is a local link. Based on the locally collected traffic information associated with RPL 170 and uplink 182 and received traffic information associated with uplinks 184 and 186, network device 122 can determine the source of the loop.

Network device 122 can then determine whether RPL 170, which should be disabled, is enabled for VLAN 112. In other words, network device 122 can determine whether VLAN 112 is enabled on RPL 170 even though VLAN 112 should not be enabled on port 172. Network device 122 can determine whether the byte counters for RPL 170 are active for VLAN 112. If they are active, transmit and receive counter values can increment in the past within a predetermined period (e.g., during the last x seconds). Such increments can indicate that packets have been transmitted over RPL 170. If the byte counters are active and increasing, network device 122 can determine that the source of the loop is ring network 120 (i.e., the loop is a ring loop). Network device 122 can then disable VLAN 112 on RPL 170, thereby disabling the loop.

Network device 122 can also determine whether the byte counters for standby uplinks 184 and 186 are active for VLAN 112 while the byte counters of active uplink 182 are active, network device 122 can determine that multiple uplinks are forwarding traffic at the same time. Hence, network device 122 can determine that the source of the loop can be the uplinks to the external network (i.e., the loop is an uplink loop). Since VLAN 112 is disabled for uplinks 182, 184, and 186, network device 122 can select an active uplink for VLAN 112 from uplinks 182, 184, and 186, and activate it (e.g., either locally or based on an instruction). On the other hand, if RPL 170 is disabled for VLAN 112 and only active uplink 182 is forwarding traffic, network device 122 can determine that the loop is in external network 120 (i.e., the loop is an external loop). The administrator of external network 120 can then be notified regarding the external loop.

For a ring loop, the MAC address of network device 124 can be present in the layer-2 cache (e.g., the MAC learning table) of port 174 in association with VLAN 112. The MAC address in the layer-2 cache can indicate that the MAC address is learned at port 174, and the looped packet is looped back via RPL 170. For an uplink loop, the MAC address of network device 124 can be present in the layer-2 cache of one of the uplink ports, such as ports 176 and 178. The presence of the MAC address can then indicate that the MAC address is learned at port 176 or 178, and the looped packet is looped back through ring network 120 via one of the uplinks. On the other hand, for an external loop, the MAC address of network device 124 can be present in the layer-2 cache of port 178 of active uplink 182, which can indicate that the looped packet is looped back via active uplink 182. In this way, ring network 120 can support efficient detection of the source of the loop.

Figure 1B:
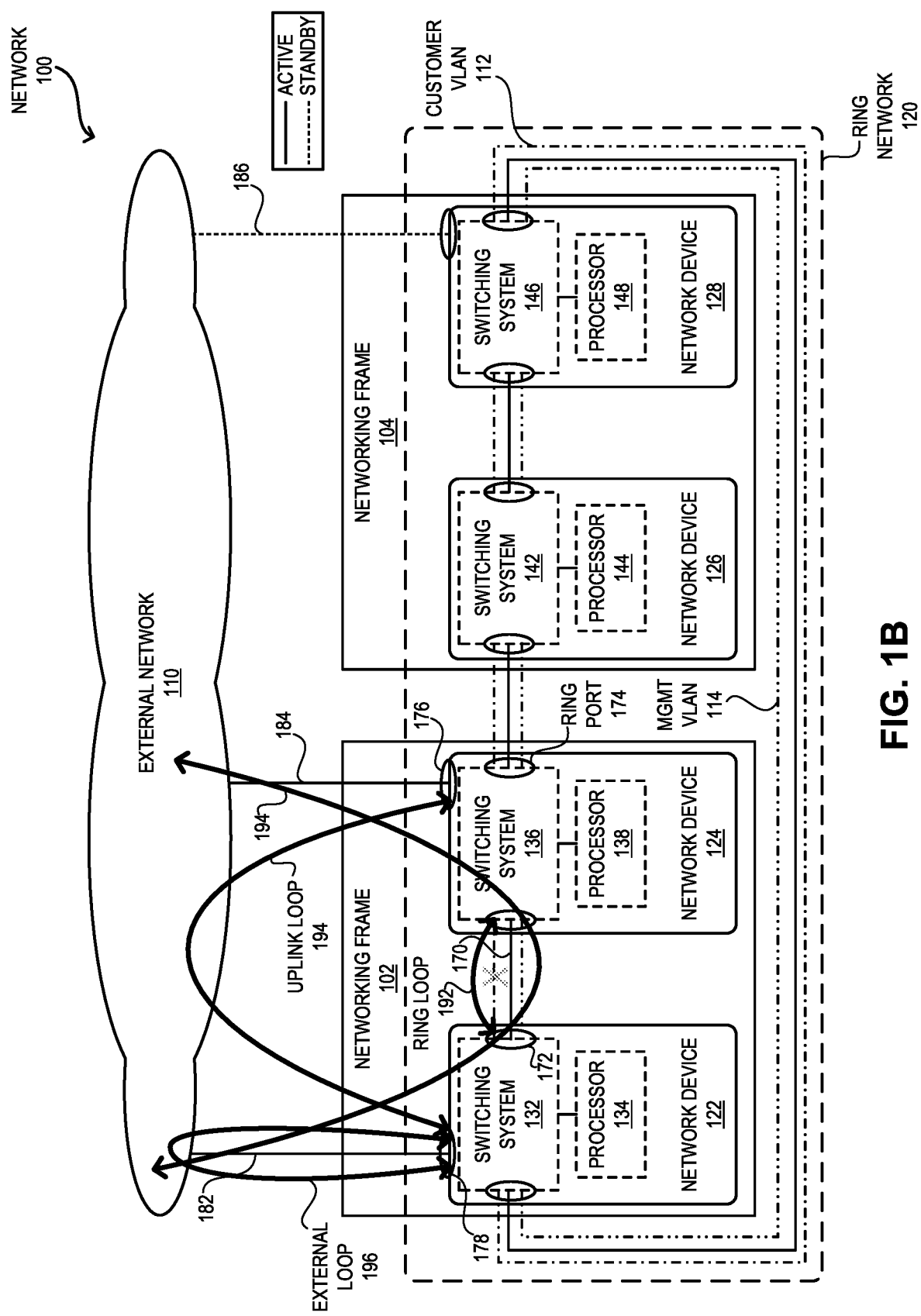
FIG. 1B illustrates examples of sources of layer-2 loops detectable in a ring network, in accordance with an aspect of the present application.

FIG. 1B illustrates examples of sources of layer-2 loops detectable in a ring network, in accordance with an aspect of the present application. In ring network 120, a loop can be a ring loop 192, an uplink loop 194, or an external loop 196. For example, ring network 120 can include ring loop 192 for VLAN 112 if RPL 170 is improperly configured (i.e., VLAN 112 is enabled on port 172). Under such a scenario, all links in ring network 120 may remain enabled for VLAN 112, thereby forming loop 192 on VLAN 112. Packets can flow via ring loop 192 from left to right, right to left, or both directions. In this example, packets flowing from the left to right direction can loop back to external network 110 by sequentially traversing uplink 182, network devices 124, 126, 128, 122, 124, and uplink 182. On the other hand, packets flowing from the right to left direction can loop back to external network 110 by sequentially traversing uplink 182, network devices 124, 122, 128, 126, 124, and uplink 182.

In addition, to facilitate high availability, network devices 122, 124, and 126 can be coupled to external network 110 via uplinks 182, 184, and 186, respectively. If ring network 120 is properly configured, only uplink 182 should be enabled in ring network 120, ensuring a single active uplink 182 to external network 110. However, if another uplink 184 is also active at the same time (e.g., due to a configuration error) for VLAN 112, there can be uplink loop 194 in ring network 120 for VLAN 112. Uplink loop 194 can allow packets to loop back to external network 110 via ring network 120, or loop back to ring network 120 via external network 110. Packets can flow via uplink loop 194 from a single or both directions.

Furthermore, if external network 110 is misconfigured, an external loop 196 may exist in external network 110 for VLAN 112 and can impact the traffic in ring network 120. In particular, external loop 196 can allow packets to loop back to ring network 120 via external network 110 via uplink 182. To determine the source of a loop, network device 122 can use traffic information on RPL 180 and uplinks 182, 184, and 186. Hence, regardless of the direction of traffic on a loop, network device 122 can identify whether a loop detected in ring network 120 corresponds to loop 192, 194, or 196.

Figure 2:
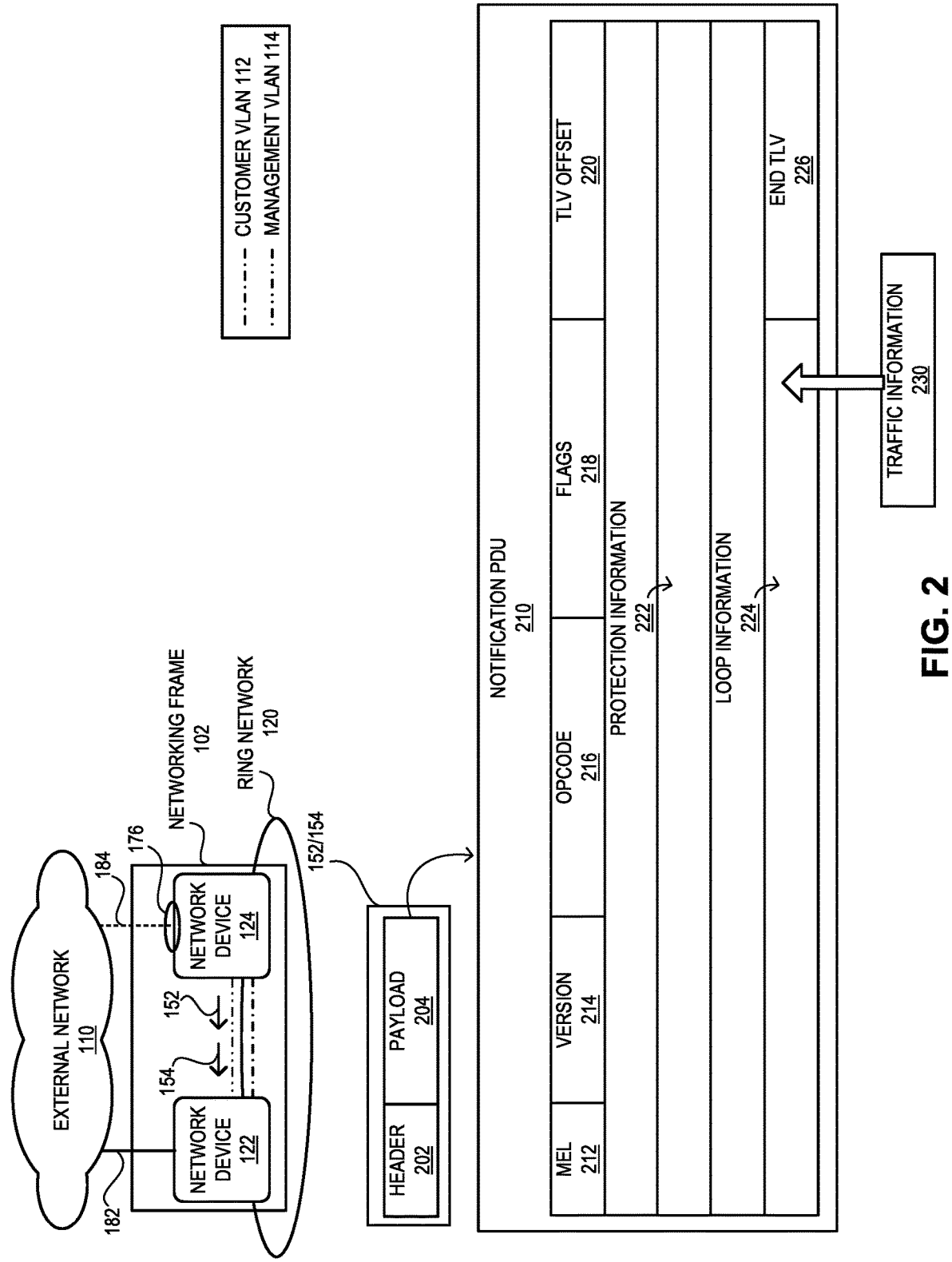
FIG. 2 illustrates an example of a notification message for efficiently identifying the source of a layer-2 loop in a ring network, in accordance with an aspect of the present application.

FIG. 2 illustrates an example of a notification message for efficiently identifying the source of a layer-2 loop in a ring network, in accordance with an aspect of the present application. Network device 124 can send notification message 152 via VLAN 114 to notify the presence of a loop in ring network 120. Network device 124 can also send information message 154 with traffic information 230 associated with uplink 184 to network device 122 via VLAN 114. Messages 152 and 154 can include a header 202, such as a layer-2 header (e.g., an Ethernet header), and a payload 204. For notification message 152, the source and destination addresses of header 202 can be the MAC address of network device 124 and a multicast MAC address, respectively. Based on the multicast MAC address, a respective network device of ring network 120 can receive notification message 152 via VLAN 114. For information message 154, the source and destination addresses of header 202 can be the MAC addresses of network devices 124 and 122, respectively.

For messages 152 and 154, payload 204 can include a notification packet data unit (PDU) 210 (e.g., an R-APS PDU based on ITU standard G.8032). Notification PDU 210 can include a set of fields, including a maintenance entity group (MEG) level (MEL) 212, an ERSP version 214, an operational code (opcode) 216, a set of predefined flags 218, a type-length-value (TLV) offset 220, and a predefined end TLV 226. Opcode 216 indicates the type of message carried by notification PDU 210. For example, opcode 216 can indicate whether notification PDU 210 is included in a notification message or an information message based on respective predefined values. As a result, when network device 124 sends message 152 or 154, network device 122 can recognize the type of message from opcode 216.

TLV offset 220 can include a predefined value and indicate that the subsequent bytes of notification PDU 210 includes the TLV. Notification PDU 210 can then include protection information 222, which can include R-APS-specific information. The sub-fields of protection information 222 can depend on the ERSP version. The information included in protection information 222 can be specified by ITU standard Y.1731, which defines operations, administration, and maintenance (OAM) functions and mechanisms for Ethernet-based networks. Notification PDU 210 can also include loop information 224, which can include information associated with messages 152 and 154. In other words, network device 124 can provide details associated with the detected loop or traffic information 230 in loop information 224.

Loop information 224 can include one or more of: the MAC address of network device 124, the IPv6 link-layer address of network device 124, the identifier of the bay housing network device 124 in networking frame 102, and an identifier of the primary network device (e.g., the MAC address of network device 122). If information PDU 210 is included in information message 154, loop information 224 can also include traffic information 230. Traffic information 230 can include one or more of: the state of port 176 (e.g., standby or active), transmit counter value of uplink 184 for VLAN 112, receive counter value of uplink 184 for VLAN 112, and the MAC addresses stored associated with VLAN 112 in the layer-2 cache of port 176. If network device 122 determines that the counter values of uplink 184 are active and increasing while the counter values of uplink 182 are active and increasing, network device 122 can identify the presence of an uplink loop.

Figure 3:
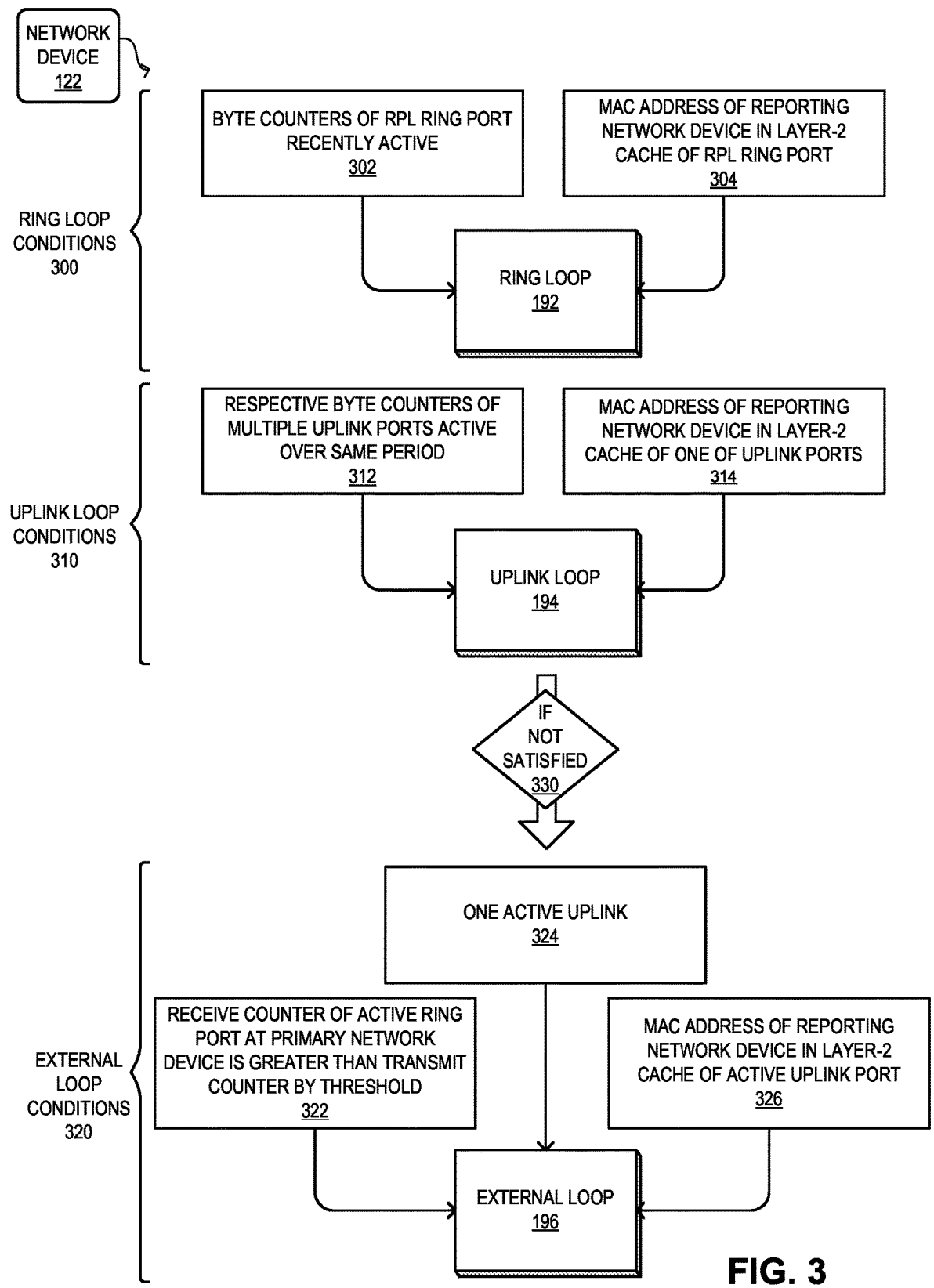
FIG. 3 illustrates an example of a notification message for efficiently identifying the source of a layer-2 loop in a ring network, in accordance with an aspect of the present application.

FIG. 3 illustrates an example of a notification message for efficiently identifying the source of a layer-2 loop in a ring network, in accordance with an aspect of the present application. To identify ring loop 192, uplink loop 194, and external loop 196, network device 122 can determine whether ring loop conditions 300, uplink loop conditions 310, and external loop conditions 320, respectively, are satisfied. Ring loop conditions 300 can indicate that the byte counters of the ring port associated with the RPL are recently active (e.g., for the last x seconds) (condition 302). If the counters have increased within the last x seconds when the RPL is expected to be inactive, network device 122 can determine that the RPL has been actively forwarding traffic, which is indicative of a loop.

Ring loop conditions 300 may also indicate that the MAC address of the reporting network device is present in the layer-2 cache of the ring port associated with the RPL (condition 304). The presence of the MAC address in the layer-2 cache can confirm that the looped packet has been forwarded via the RPL ring port. When network device 122 determines that ring loop conditions 300 are satisfied, network device 122 can determine that the source of the determined loop is the ring network. Network device 122 can then perform a mitigating operation to disable the ring loop. Such an operation can include disabling a respective customer VLAN on the RPL.

Uplink loop conditions 310 can indicate that the byte counters of multiple uplink ports are active over the same period (e.g., for the last x seconds) (condition 312). If the counters of a standby uplink port have increased while the counters of the active uplink port have also increased, network device 122 can determine that the multiple uplinks have been operational and actively forwarding traffic. Ring loop conditions 300 may also indicate that the MAC address of the reporting network device is present in the layer-2 cache of one of the uplink ports (condition 314). The presence of the MAC address in the layer-2 cache can confirm that the looped packet has been forwarded via the corresponding uplink port. When network device 122 determines that ring loop conditions 310 are satisfied, network device 122 can determine that the source of the determined loop is in the uplinks. Network device 122 can then ensure that only one uplink is in the active state to disable the uplink loop.

If a loop is detected, and conditions 300 and 310 are not satisfied (condition 330), network device can determine that the source of the loop is likely in the external network. To ensure the presence of an external loop, external loop conditions 320 can indicate that the receive counter of the active ring port of the primary network device is greater than the corresponding transmit counter by a threshold (condition 332). This disparity can indicate that the looped traffic is forwarded via the active ring port of the primary network device. Ring loop conditions 300 may also indicate that there is only one active uplink (condition 324) and the MAC address of the reporting network device is present in the layer-2 cache of the active uplink port (condition 326). The presence of the MAC address in the layer-2 cache can confirm that the looped packet has been forwarded via the corresponding uplink port. Network device 122 can then generate a notification indicating the external loop.

Figure 4A:
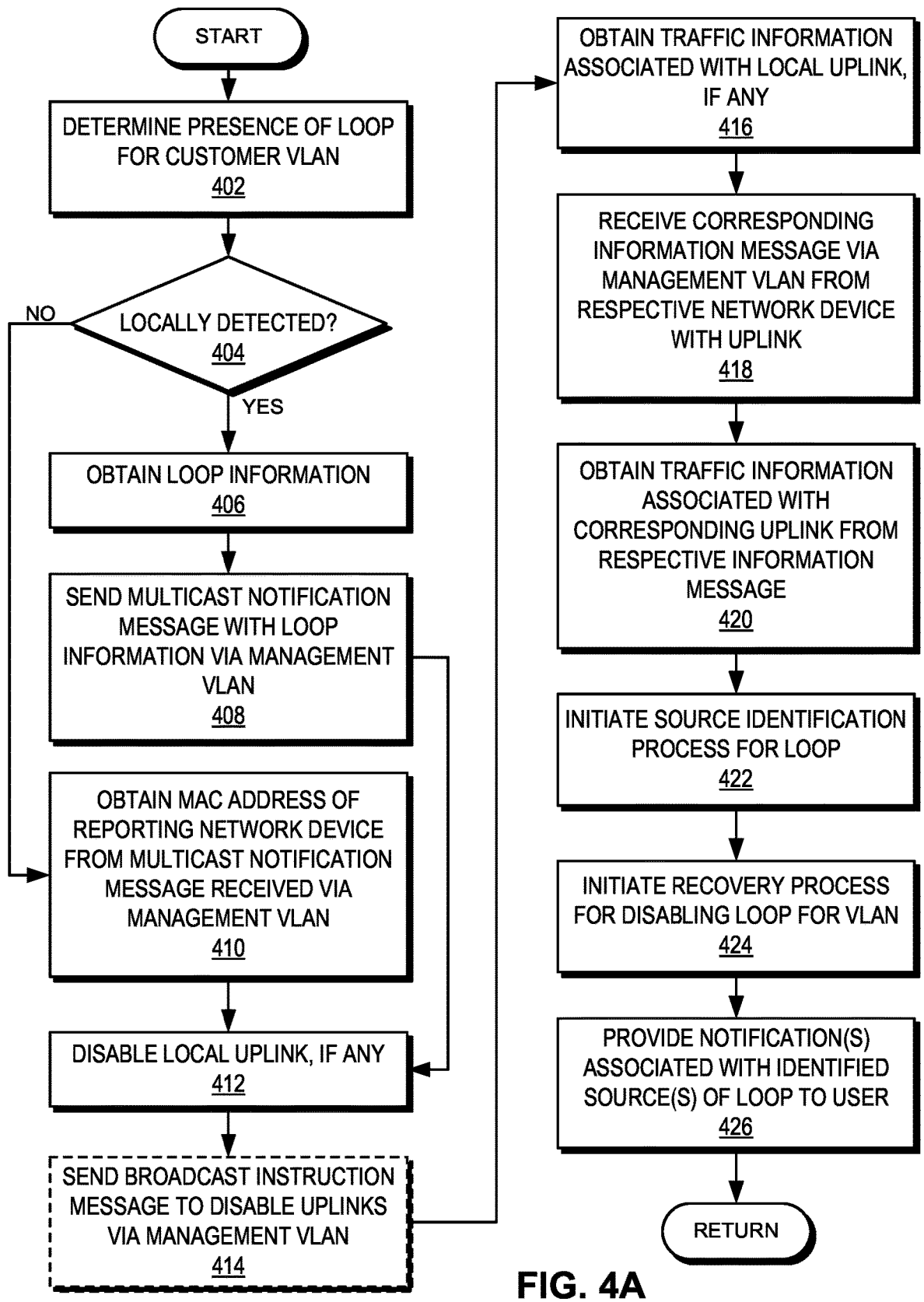
FIG. 4A presents a flowchart illustrating the process of a primary network device identifying the source of a layer-2 loop in a ring network, in accordance with an aspect of the present application.

FIG. 4A presents a flowchart illustrating the process of a primary network device identifying the source of a layer-2 loop in a ring network, in accordance with an aspect of the present application. During operation, the network device can determine the presence of a loop for a customer VLAN (operation 402) and determine whether the loop is locally detected (operation 404). If the loop is locally detected (e.g., detected by the application running on the local processor), the network device can obtain the corresponding loop information (operation 406) and send a multicast notification message with the loop information via the management VLAN (operation 408). On the other hand, if the loop is not locally detected (e.g., detected based on a notification message), the network device can obtain the MAC address of the reporting network device from a multicast notification message received via the management VLAN (operation 410).

Upon sending the multicast notification message (operation 408) or obtaining the MAC address of the reporting network device (operation 410), the network device can disable any local uplink, if any (operation 412). The network device, optionally, can also send a broadcast instruction message to disable the uplinks via the management VLAN (denoted with dashed lines) (operation 414). The broadcast message can ensure that all uplinks from the ring network are disabled when a loop is detected. The network device can then obtain traffic information associated with the local uplink, if any (operation 416). Subsequently, the network device can receive corresponding information message via the management VLAN from a respective network device with an uplink (operation 418).

The network device can then obtain traffic information associated with the corresponding uplink from a respective information message (operation 420). At this point, the network device has received traffic information associated with a respective uplink from the ring network. The network device can then initiate the source identification process for the loop (operation 422). The network device can also initiate a recovery process for disabling the loop for the VLAN (operation 424). In addition, the network device may provide notification(s) associated with the identified source(s) of the loop to the user (operation 426). For example, the network device may provide the notification(s) to a management platform that can present them to the user.

Figure 4B:
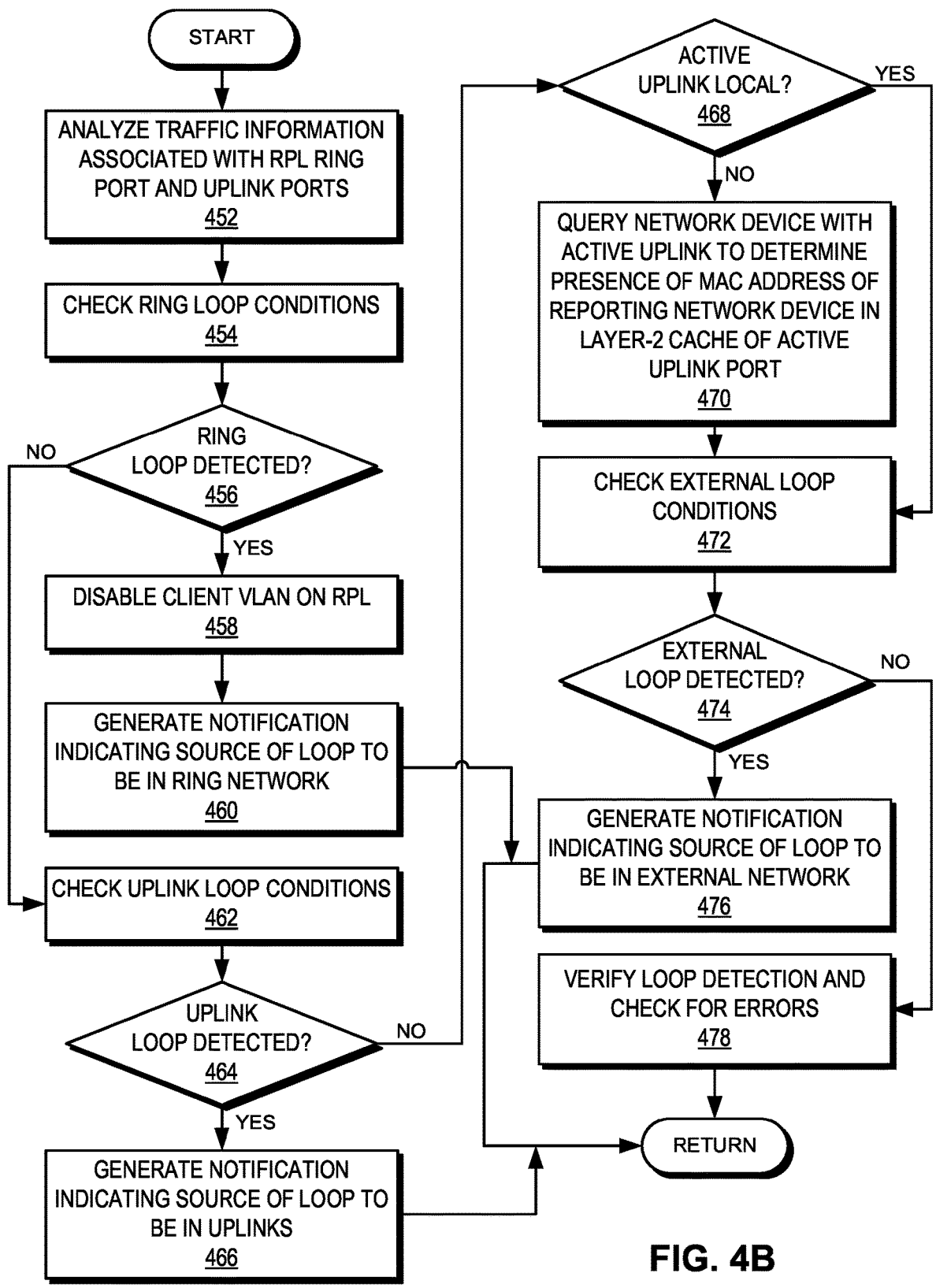
FIG. 4B presents a flowchart illustrating the process of a primary network device checking loop conditions for identifying the source of a layer-2 loop in a ring network, in accordance with an aspect of the present application.

FIG. 4B presents a flowchart illustrating the process of a primary network device checking loop conditions for identifying the source of a layer-2 loop in a ring network, in accordance with an aspect of the present application. During operation, the network device can analyze the information associated with the RPL ring port and the uplinks ports (operation 452). The network device can then check the ring loop conditions (operation 454) and determine whether a ring loop is detected (operation 456). If a ring loop is detected, the network device can disable the client VLAN on the RPL (operation 458) and generate a notification indicating the source of the loop to be in the ring network (operation 460).

On the other hand, if a ring loop is not detected, the network device can then check the uplink loop conditions (operation 462) and determine whether an uplink loop is detected (operation 464). If an uplink loop is detected, the network device can generate a notification indicating the source of the loop to be in the uplinks (operation 466). If a ring loop or an uplink loop is not detected (operations 456 and 464), the network device can determine whether the active uplink is local (operation 468). If the active uplink is not local, the network device can query another network device with the active uplink to determine the presence of the MAC address of the reporting network device in the layer-2 cache of the active uplink port (operation 470).

Querying the network device with the active uplink can include sending a query message comprising the query and receiving a response indicating whether the MAC address of the reporting network device is present in the layer-2 cache. If the active link is local (operation 468) or upon determining whether the MAC address of the reporting network device is present in the layer-2 cache (operation 470), the network device can check the external loop conditions (operation 472). The network device can then determine whether an external loop is detected (operation 474). If an external loop is detected, the network device can generate a notification indicating the source of the loop to be in the external network (operation 476). However, if none of the conditions are satisfied and yet, a loop is detected, the network device may verify the loop detection and check for errors (operation 478).

Figure 5A:
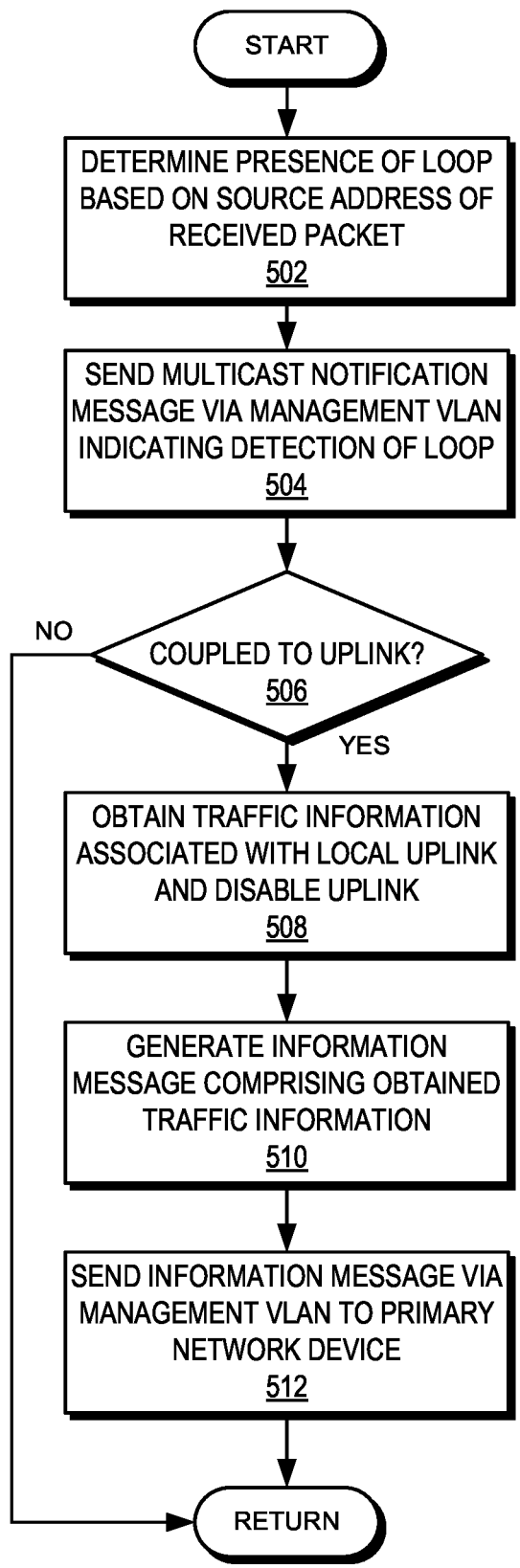
FIG. 5A presents a flowchart illustrating the process of a reporting network device providing information for identifying the source of a layer-2 loop in a ring network, in accordance with an aspect of the present application.

FIG. 5A presents a flowchart illustrating the process of a reporting network device providing information for identifying the source of a layer-2 loop in a ring network, in accordance with an aspect of the present application. During operation, the network device can determine the presence of a loop based on the source address of a received packet (operation 502) and send a multicast notification message via the management VLAN indicating the detection of the loop (operation 504). The network device can then determine whether it is coupled to an uplink (e.g., a connection or cable is present between the external network and the local network device) (operation 506).

If the network device is coupled to an uplink, the network device can obtain traffic information associated with the local uplink and disable the uplink (operation 508). In this way, the network device may disable the uplink even without receiving an explicit instruction from the primary network device. The network device can then generate an information message comprising the obtained traffic information (operation 510). Subsequently, the network device can send the information message via the management VLAN to the primary network device (operation 512).

Figure 5B:
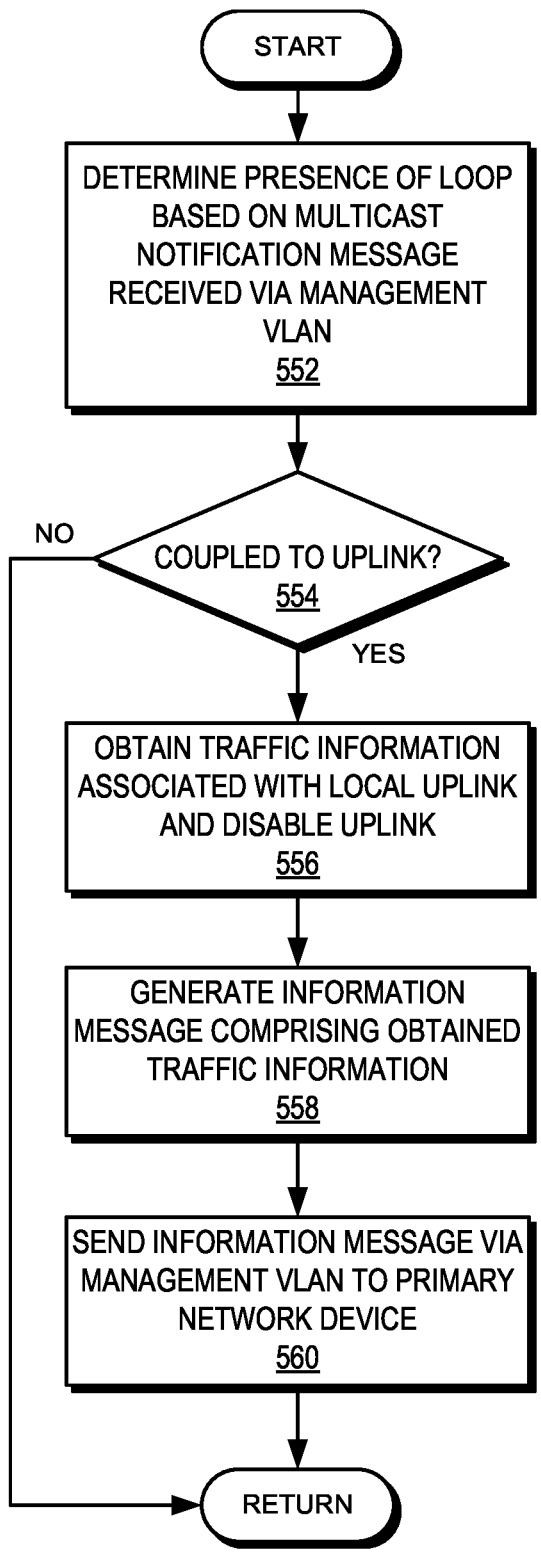
FIG. 5B presents a flowchart illustrating the process of a non-reporting network device providing information for identifying the source of a layer-2 loop in a ring network, in accordance with an aspect of the present application.

FIG. 5B presents a flowchart illustrating the process of a non-reporting network device providing information for identifying the source of a layer-2 loop in a ring network, in accordance with an aspect of the present application. During operation, the network device can determine the presence of a loop based on a multicast notification message received via the management VLAN (operation 552) and determine whether it is coupled to an uplink (operation 554). If the network device is coupled to an uplink, the network device can obtain traffic information associated with the local uplink and disable the uplink (operation 556). The network device can then generate an information message comprising the obtained traffic information (operation 558) and send the information message via the management VLAN to the primary network device (operation 560).

Figure 6:
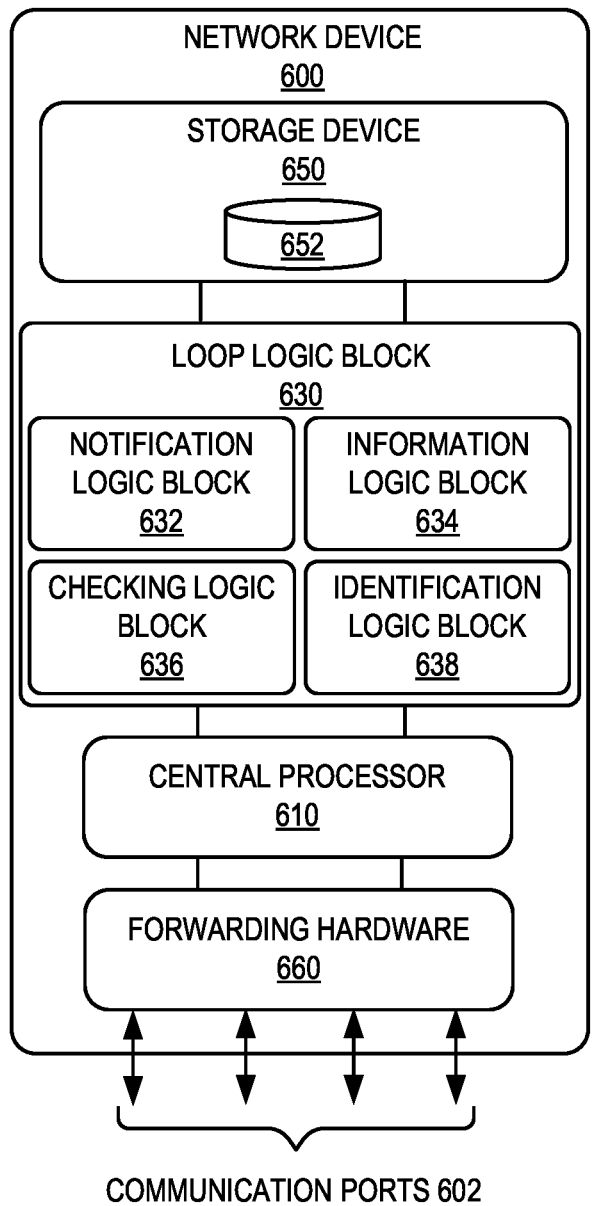
FIG. 6 illustrates an example of a network device supporting efficient identification of the source of a layer-2 loop in a ring network, in accordance with an aspect of the present application.

FIG. 6 illustrates an example of a network device supporting efficient identification of the source of a layer-2 loop in a ring network, in accordance with an aspect of the present application. In this example, a network device 600 can include a number of communication ports 602, a central processor 610, and a storage device 650. Network device 600 can operate within a networking frame and can be in a ring network. Network device 600 can also include forwarding hardware 660 (e.g., processing hardware of network device 600, such as application-specific integrated circuit (ASIC) chips), which includes information based on which network device 600 processes packets (e.g., determines output ports for packets).

In other words, forwarding hardware 660 includes switching circuitry for network device 600. Forwarding hardware 660 can include a field processor that can extract and processes header information from the received packets. The field processor can identify a switch identifier (e.g., a MAC address and/or an IP address) associated with network device 600 in the header of a packet. On other hand, the operating software and the switch driver can operate on central processor 610. Network device 600 can maintain a database 652 (e.g., in storage device 650). Database 652 can be a relational database and may run on one or more Database Management System (DBMS) instances. Database 652 can store information associated with routing, configuration, and interface of network device 600.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. The field processor can process Ethernet frames and/or IP packets. A respective port of communication ports 602 may operate as an ingress port and/or an egress port.

Network device 600 can include a loop logic block 630 that can detect a loop in the ring network and identify the source of the loop. Loop logic block 630 can include a notification logic block 632, an information logic block 634, a checking logic block 636, and an identification logical block 638. Upon detecting the loop, notification logic block 632 can send a multicast notification message indicating the presence of the loop. Information logic block 634 can obtain traffic information associated with a link (e.g., an RPL and an uplink). Information logic block 634 can also obtain information indicating whether a MAC address is present in a layer-2 cache. Notification logic block 632 can then send an information message with corresponding traffic information. Checking logic block 636 can check the ring loop conditions, uplink loop conditions, and external link conditions. Identification logic block 638 can identify the source of the loop based on the checking.

One aspect of the present technology can provide a system for identifying the source of a loop in a ring network. The system can operate as a primary network device of the ring network based on a ring network protocol. During operation, the system can receive a first message from a second network device of the ring network. The first message can indicate the presence of a looped packet at the second network device. The system can receive a second message from a respective network device with an uplink to an external network coupled to the ring network. The second message can include traffic information associated with the uplink. Upon determining based on the first message that a local link intended to be disabled in the ring network is active, the system can determine that a loop is present in the ring network. Upon determining that a plurality of uplinks to the external network are active based on the second message, the system can determine that a loop is present in the uplinks to the external network. On the other hand, upon determining that a loop is not present in the ring network or in the links to the external network, the system can determine that a loop is present in the external network.

In a variation on this aspect, the system determines that the loop is present in the external network by determining that a single uplink to the external network is active and determining that a layer-2 address of the second network device is learned at a port coupling the single uplink.

In a variation on this aspect, the system determines that the local link is active by determining whether byte counts for the local link fora predetermined period and determining whether a layer-2 address of the second network device is learned at a local port coupling the local link. Here, an active byte count for the local link can indicate the transmission of bytes of a packet via the local link.

In a variation on this aspect, the system determines that the plurality of uplinks to the external network are active by determining whether byte counts for the plurality of uplinks are active fora same period and determining whether a layer-2 address of the second network device is learned at a port coupling one of the plurality of uplinks. Here, an active byte count for an uplink indicates the transmission of bytes of a packet via the uplink.

In a further variation, the system can determine an egress port of the switch fora packet belonging to the VLAN, wherein the egress port is associated with the first tunnel.

In a variation on this aspect, the first and second messages can include one or more of: a layer-2 address of the second network device, an Internet Protocol (IP) version 6 (IPv6) link-layer address of the second network device, a bay number associated with the second network device, and an identifier of the primary network device.

In a further variation, the second message from the respective network device with an uplink can also include one or more of: a state of a port coupling the uplink, a transmit counter value for the uplink, a receive counter value for the uplink, and layer-2 addresses stored in a layer-2 cache of the port coupling the uplink.

In a variation on this aspect, the traffic information can be associated with a customer virtual local area network (VLAN). Here, the local link can be intended to be disabled for the customer VLAN.

In a variation on this aspect, the first and second messages can be received at the network device via a management VLAN, which can be dedicated for carrying control traffic in the ring network.

In a variation on this aspect, the ring network protocol includes an Ethernet ring protection switching (ERPS) protocol.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   receiving, by a network device of a ring network, a first message from a second network device of the ring network, wherein the first message indicates presence of a looped packet at the second network device, and wherein the network device operates as a primary network device based on a ring network protocol;
   receiving, by the network device, a second message from a respective network device with an uplink to an external network coupled to the ring network, wherein the second message includes traffic information associated with the uplink;
   in response to determining, based on the first message, that a local link intended to be disabled in the ring network is active, determining that a loop is present in the ring network;
   in response to determining that a plurality of uplinks to the external network are active based on the second message, determining that a loop is present in the uplinks to the external network; and
   in response to determining that a loop is not present in the ring network or in the uplinks to the external network, determining that a loop is present in the external network.

2. The method of claim 1, wherein determining that the loop is present in the external network further comprises:
   determining that a single uplink to the external network is active; and
   determining that a layer-2 address of the second network device is learned at a port coupling the single uplink.

3. The method of claim 1, wherein determining that the local link is active further comprises:
   determining whether byte counts for the local link for a predetermined period, wherein an active byte count for the local link indicates transmission of bytes of a packet via the local link; and
   determining whether a layer-2 address of the second network device is learned at a local port coupling the local link.

4. The method of claim 1, wherein determining that the plurality of uplinks to the external network are active further comprises:
   determining whether byte counts for the plurality of uplinks are active fora same period, wherein an active byte count for an uplink indicates transmission of bytes of a packet via the uplink; and
   determining whether a layer-2 address of the second network device is learned at a port coupling one of the plurality of uplinks.

5. The method of claim 4, further comprising obtaining the byte counts from the second message.

6. The method of claim 1, wherein the first and second messages comprise one or more of: a layer-2 address of the second network device, an Internet Protocol (IP) version 6 (IPv6) link-layer address of the second network device, a bay number associated with the second network device, and an identifier of the primary network device.

7. The method of claim 6, wherein the second message from the respective network device with an uplink further comprises one or more of: a state of a port coupling the uplink, a transmit counter value for the uplink, a receive counter value for the uplink, and layer-2 addresses stored in a layer-2 cache of the port coupling the uplink.

8. The method of claim 1, wherein the traffic information is associated with a customer virtual local area network (VLAN), wherein the local link is intended to be disabled for the customer VLAN.

9. The method of claim 1, wherein the first and second messages are received at the network device via a management VLAN, and wherein the management VLAN is dedicated for carrying control traffic in the ring network.

10. The method of claim 1, wherein the ring network protocol includes an Ethernet ring protection switching (ERPS) protocol.

11. A non-transitory computer-readable storage medium storing instructions that when executed by a computing system cause the computing system to perform a method, the method comprising:
   receiving, by a network device of a ring network, a first message from a second network device of the ring network, wherein the first message indicates presence of a looped packet at the second network device, and wherein the network device operates as a primary network device based on a ring network protocol;
   receiving, by the network device, a second message from a respective network device with an uplink to an external network coupled to the ring network, wherein the second message includes traffic information associated with the uplink;
   in in response to determining, based on the first message, that a local link intended to be disabled in the ring network is active, determining that a loop is present in the ring network;
   in response to determining that a plurality of uplinks to the external network are active based on the second message, determining that a loop is present in the uplinks to the external network; and
   in response to determining that a loop is not present in the ring network or in the uplinks to the external network, determining that a loop is present in the external network.

12. The non-transitory computer-readable storage medium of claim 11, wherein determining that the loop is present in the external network further comprises:
   determining that a single uplink to the external network is active; and
   determining that a layer-2 address of the second network device is learned at a port coupling the single uplink.

13. The non-transitory computer-readable storage medium of claim 11, wherein determining that the local link is active further comprises:
   determining whether byte counts for the local link fora predetermined period, wherein an active byte count for the local link indicates transmission of bytes of a packet via the local link; and determining whether a layer-2 address of the second network device is learned at a local port coupling the local link.

14. The non-transitory computer-readable storage medium of claim 11, wherein determining that the plurality of uplinks to the external network are active further comprises:
   determining whether byte counts for the plurality of uplinks are active fora same period, wherein an active byte count for an uplink indicates transmission of bytes of a packet via the uplink; and
   determining whether a layer-2 address of the second network device is learned at a port coupling one of the plurality of uplinks.

15. The non-transitory computer-readable storage medium of claim 14, wherein the method further comprises obtaining the byte counts from the second message.

16. The non-transitory computer-readable storage medium of claim 11, wherein the first and second messages comprise one or more of: a layer-2 address of the second network device, an Internet Protocol (IP) version 6 (IPv6) link-layer address of the second network device, a bay number associated with the second network device, and an identifier of the primary network device.

17. The non-transitory computer-readable storage medium of claim 16, wherein the second message from the respective network device with an uplink further comprises one or more of: a state of a port coupling the uplink, a transmit counter value for the uplink, a receive counter value for the uplink, and layer-2 addresses stored in a layer-2 cache of the port coupling the uplink.

18. The non-transitory computer-readable storage medium of claim 11, wherein the traffic information is associated with a customer virtual local area network (VLAN), wherein the local link is intended to be disabled for the customer VLAN.

19. The non-transitory computer-readable storage medium of claim 11, wherein the first and second messages are received at the network device via a management VLAN, and wherein the management VLAN is dedicated for carrying control traffic in the ring network.

20. A network device, comprising:
   processing circuitry;
   forwarding hardware;
   a notification logic block to:
      receive, via a ring network, a first message from a second network device of the ring network, wherein the first message indicates presence of a looped packet at the second network device, and wherein the network device operates as a primary network device based on a ring network protocol; and
      receive a second message from a respective network device with an uplink to an external network coupled to the ring network, wherein the second message includes traffic information associated with the uplink; and
   a loop identification logic block to:
      in response to determining, based on the first message, that a local link intended to be disabled in the ring network is active, determine that a loop is present in the ring network;
      in response to determining that a plurality of uplinks to the external network are active based on the second message, determine that a loop is present in the uplinks to the external network; and
      in response to determining that a loop is not present in the ring network or in the uplinks to the external network, determine that a loop is present in the external network.

\* \* \* \* \*